United States Patent
Boscolo Berto et al.

(10) Patent No.: US 9,391,551 B2
(45) Date of Patent: Jul. 12, 2016

(54) APPARATUS TO DETECT THE ZERO-CROSS OF THE BEMF OF A THREE-PHASE ELECTRIC MOTOR AND RELATED METHOD

(71) Applicant: STMICROELECTRONICS S.R.L., Agrate Brianza (IT)

(72) Inventors: Michele Boscolo Berto, Milan (IT); Federico Magni, Settimo Milanese (IT)

(73) Assignee: STMICROELECTRONICS S.R.L., Agrate Brianza (MB) (IT)

( * ) Notice: Subject to any disclaimer, the term of this patent is extended or adjusted under 35 U.S.C. 154(b) by 0 days.

(21) Appl. No.: 14/307,643

(22) Filed: Jun. 18, 2014

(65) Prior Publication Data

US 2015/0002065 A1  Jan. 1, 2015

(30) Foreign Application Priority Data

Jun. 28, 2013 (IT) .............................. MI2013A1082

(51) Int. Cl.
H02P 6/18 (2006.01)

(52) U.S. Cl.
CPC ....................................... *H02P 6/182* (2013.01)

(58) Field of Classification Search
USPC .......................... 360/73.03; 307/9.1; 327/231; 318/400.13, 504
See application file for complete search history.

(56) References Cited

U.S. PATENT DOCUMENTS

| 5,969,491 | A | 10/1999 | Viti et al. |
| 6,420,847 | B1 | 7/2002 | Galbiati et al. |
| 2005/0116762 | A1* | 6/2005 | Van Bijnen ....... H02M 7/53871 327/335 |
| 2005/0258788 | A1 | 11/2005 | Mori et al. |
| 2006/0044664 | A1* | 3/2006 | Itagaki .................... G11B 19/28 360/73.03 |
| 2006/0104343 | A1* | 5/2006 | Agarwal ................... H03K 7/08 375/238 |
| 2007/0296360 | A1* | 12/2007 | Viti ......................... H02P 6/182 318/254.1 |
| 2008/0252238 | A1* | 10/2008 | Otaguro ................. G11B 19/28 318/400.05 |
| 2009/0243688 | A1* | 10/2009 | Khoury ..................... H03F 1/26 327/335 |
| 2013/0069580 | A1* | 3/2013 | Ogawa .................... H02P 27/08 318/504 |
| 2013/0334876 | A1* | 12/2013 | Yamaguchi ............... G05F 1/10 307/9.1 |
| 2014/0333276 | A1* | 11/2014 | Arno ................. H02M 3/33569 323/282 |

FOREIGN PATENT DOCUMENTS

EP 1091480 A1 4/2001

* cited by examiner

*Primary Examiner* — Eduardo Colon Santana
*Assistant Examiner* — Cortez Cook
(74) *Attorney, Agent, or Firm* — Allen, Dyer, Doppelt, Milbrath & Gilchrist, P.A.

(57) ABSTRACT

A device may detect the zero-cross event of a BEMF of an electric motor with first, second, and third phase windings driven by respective first, second, and third power driving stages. The device may include a control circuit configured to place at an impedance state the third power driving stage relative to the third phase winding, the third phase winding being coupled to a zero-cross detecting circuit, introduce a masking signal to mask an output signal of the zero-cross detecting circuit in correspondence with each rising edge of a first driving signal of the first power driving stage relative to the first phase winding, and determine whether a first duty-cycle of the first driving signal is such that a duration of a masking window of the masking signal is greater than an on-time period of the first driving signal.

18 Claims, 6 Drawing Sheets

APPARATUS TO DETECT THE ZERO-CROSS OF THE BEMF OF A THREE-PHASE ELECTRIC MOTOR AND RELATED METHOD

TECHNICAL FIELD

The present disclosure relates to an apparatus to detect a zero-cross of the back electromotive force of a three-phase electric motor and related methods.

BACKGROUND

In devices with pulse width modulated (PWM) switching driven windings, such as a spindle motor, it may be necessary to precisely measure the instantaneous value of some significant electrical magnitude, such as the back electromotive force (BEMF), and more specifically, the zero-cross instant of these generally alternating signals. The zero-cross detection of back electromotive forces in the windings of spindle motors may be useful to synchronize the phase switching with the rotor position to produce greater and more uniform torque. Particularly, the zero-cross detection of BEMFs is useful to drive the permanent magnet synchronous motors (PMSM) employed as spindle motors in a Hard Disk, CD, DVD, etc.

Detection of the crossing instants of pre-established threshold values by alternating electrical signals may be conveniently made by shifting the level of the signal by an amount equal to and of opposite sign of the threshold value and detecting the zero-cross instants of the level-shifted signal. Given that detection of the crossing instants of a certain threshold value by an electrical signal is equivalent to detecting the zero-cross instants of a suitably level shifted signal, the ensuing description will refer only to the detection of zero-cross events.

A method to detect the zero-cross of a BEMF is disclosed in U.S. Pat. No. 5,969,491 to Viti et al. which refers to a method for sensing a position of a rotor of a multi-phase brushless motor. The brushless motor includes a permanent magnet rotor, and a stator having a number of windings that may be connected in a star configuration, in a polygon (delta) configuration, or even independently from the one another. Star or polygon configurations may have a number of externally accessible terminals equal the number of phase windings of the motor (eventually with an additional terminal if the star center is made accessible). Alternatively, in cases of motors with independent phase windings, both terminals of all the phase windings are accessible. The method of U.S. Pat. No. 5,969,491 to Viti et al. uses a zero-cross detecting circuit for voltage induced on a respective phase winding of the motor driven in a multi-polar mode. The zero-cross detecting circuit comprises a differential amplifier. The method comprises interrupting a driving current of at least one of the phase windings of the motor coupled to a respective zero-cross detecting circuit by placing in a high impedance state an output of a respective driving stage using a first logic signal, and closing for a predetermined time beginning with a switching instant of the first logic signal a short-circuiting switch for inputs of the differential amplifier of the at least one zero-crossing detecting circuit using a second logic signal. The method includes enabling an asserting logic gate of a zero-cross event detected by the zero-cross detecting circuit starting from an instant of re-opening of the short-circuiting switch using a third logic signal and resetting the first logic signal and the third logic signal a period of time after the interrupting.

The driving is typically used for the PMSMs is of the PWM type, which causes the generation of disturbances at the switching instants. The disturbances may interfere with the detection of the zero-cross of a BEMF. To avoid affecting the accuracy of the zero-cross event detection, an approach may be adopted, that is a masking circuit for producing a masking signal. The masking signal has a rising edge at every front or edge of the PWM driving signal, thus preventing detection of a zero-cross event. If a zero-cross event occurs immediately after a front of the driving PWM signal, the zero-cross event will not be immediately detected by the system because the presence of the masking signal producing the masking time window. Therefore, the zero-cross event will be detected with a certain delay, i.e. when the masking signal ceases to exist.

U.S. Pat. No. 6,420,847 to Galbiati et al. discloses a method of detecting the zero-cross event of an induced BEMF. U.S. Pat. No. 6,420,847 to Galbiati et al. discloses generating an analog signal representative of the BEMF, comparing the analog signal with zero and producing a first logic signal, generating a PWM driving signal, storing the duration of the time interval between two consecutive zero-cross events, storing the value of the time interval between the last two events of zero-cross detected, synchronizing the PWM driving signal at the end of a time interval from the instant of the last zero-cross detected of duration equal to the difference between a time established in function of the stored value and a first prefixed value, and if a new zero-cross event is not detected within the established time, disabling the switching of the PWM signal for a time interval, the maximum duration of which is equal to a second prefixed value or until the occurrence of a new zero-cross event.

A condition to ensure the detection of the zero-cross of the BEMF is to have a duration of the PWM time switching period equal to at least twice the duration of the masking time window. This allows the duration of the on-time period TON or the off-time period TOFF of the PWM time switching period to have a duration always higher than or equal to the duration of the masking time window so that the detection of the zero-cross of the BEMF occurs regardless to the used duty-cycle value. In this way, the detection of the zero-cross of the BEMF occurs during the on-time period TON if the duty-cycle is higher than 50% or during the off-time period TOFF if the duty-cycle is lower than 50%.

However, there are some situations where the detection of the zero-cross of the BEMF should be carried out during the on-time period TON, i.e. when the current flows through the windings where no zero-cross of the BEMF must be detected, if the duty-cycle is lower than 50%. In this situation, setting the PWM time switching period equal to at least twice the duration of the masking time window does not ensure that the duration of the on-time period TON is higher than the duration of the masking time window.

A duty-cycle value, as a function of the selected PWM time switching period and masking time window, should be set to ensure the detection of the zero-cross of the BEMF during the on-time period TON. However, a minimum duty-cycle value may not be always set because, in the application where the duty-cycle value may assume a very low value, the setting of a minimum duty-cycle value corresponds to set a minimum current value flowing through the motor windings which is higher than the desired value. In these cases, the detection of the zero-cross of the BEMF during the on-time period TON ensures the desired current flows through the motor windings. This may be carried out by selecting a PWM time switching period value much higher than the masking time window value but this may not be possible when the duty-cycle is very low.

SUMMARY

One aspect of the present disclosure is an apparatus to detect the zero-cross of the BEMF of a three-phase electric motor regardless of the average value of the voltage across the electromagnetic load.

One aspect of the present disclosure is an apparatus to detect the zero-cross event of a BEMF of an electric motor with first, second, and third phase windings driven by respective first, second, and third power driving stage. The apparatus may include a control circuit configured to control the first, second, and third power driving stage. The control circuit may be configured to place at a high impedance state the third power driving stage relative to the third phase winding, which is coupled to a zero-cross detecting circuit, to introduce a masking signal to mask the output signal of the zero-cross detecting circuit in correspondence of each rising edge of the first PWM driving signal of the first power driving stage relative to the first phase winding. The control circuit may be configured to verify if the first duty-cycle of the first PWM driving signal is such that the duration of the masking window is greater than the on-time period of the first PWM driving signal, if the verify is positive, to drive the second power driving stage relative to the second phase winding by using a second PWM driving signal with a second duty-cycle greater than zero and to modify the value of the first duty-cycle to have a duration of the on time period of the first PWM driving signal greater than the masking window of the masking signal.

Another aspect of the present disclosure is directed to a method to detect the zero-cross event of a BEMF of an electric motor with first, second, and third phase windings driven by respective first, second, and third power driving stage. The method may comprise placing at a high impedance state the third power driving stage relative to the third phase winding, which is coupled to a zero-cross detecting circuit, and introducing a masking signal to mask the output signal of the zero-cross detecting circuit in correspondence with each rising edge of a first PWM driving signal of the first power driving stage relative to the first phase winding. The method may comprise verifying if the first duty-cycle of the first PWM driving signal is such that the duration of the masking window is greater than the on time period of the first PWM driving signal, and if the verifying step is positive, driving the second power driving stage relative to the second phase winding by means of a second PWM driving signal with a second duty-cycle greater than zero and modifying the value of the first duty-cycle to have a duration of the on time period of the first PWM driving signal greater than the masking window of the masking signal.

BRIEF DESCRIPTION OF THE DRAWINGS

For a better understanding of the present disclosure, preferred embodiments thereof are now described, purely by way of non-limiting examples and with reference to the annexed drawings, wherein.

DETAILED DESCRIPTION

Figure 1:
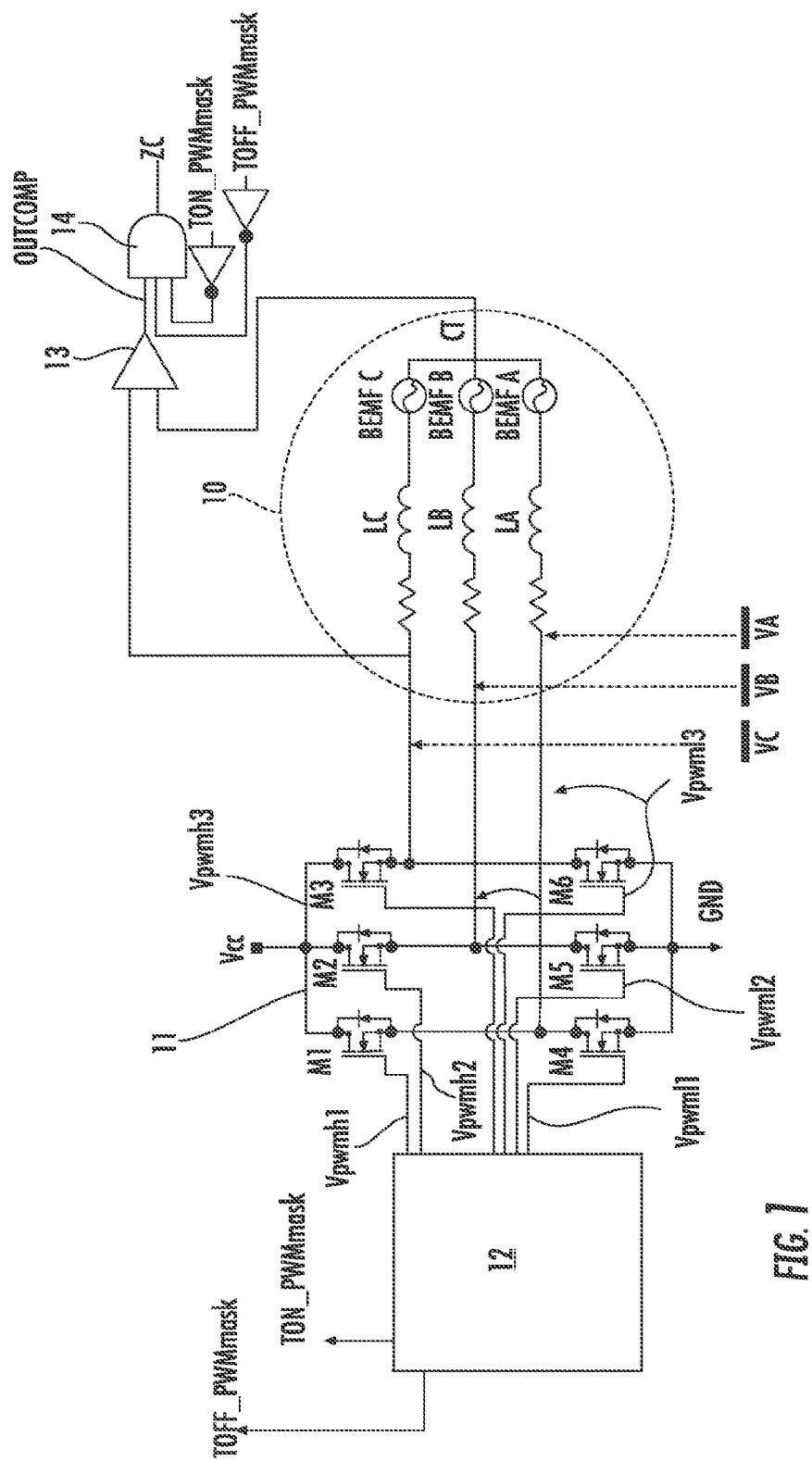
FIG. 1 shows a schematic diagram of an apparatus to detect the zero-cross of the BEMF of a three-phase electric motor, according to the present disclosure.

FIG. 1 shows a block diagram of an apparatus to detect the zero-cross of the BEMF of a three-phase electric motor, for example, a spindle motor, or a PMSM 10 according to the present disclosure. The power stage 11 comprises three half bridges M1-M4, M2-M5, M3-M6 in a push pull configuration with inherent diodes D1-D6. Each half bridge comprises two N-channel MOS transistors, but they could be P-channel or in a mixed configuration. The three half bridges are connected between the supply voltage VCC and ground GND. The half bridges M1-M4, M2-M5, M3-M6 are connected with the respective three windings LA, LB, LC of a three phase PMSM 10; the windings of the PMSM are in turn connected with the star center CT. The phase switching of the PMSM 10 is carried out by the control block 12 that drives the half bridges M1-M4, M2-M5, M3-M6 with the respective driving signals Vpwmh1, Vpwml1, Vpwmh2, Vpwml2, Vpwmh3, Vpwml3.

The average value of the output voltage of a PWM switching power stage depends on two permitted output voltage levels and the duty-cycle value, i.e. the duration TON of the phase wherein the maximum voltage is forced and the whole duration of the PWM period Tpwm. The average value Vout of the output voltage of a PWM power stage is given by: Vout=D×Ymax+(1−D)×Ymin, wherein D is the duty-cycle, Ymax is the maximum value of the PWM output signal, and Ymin is the minimum value of the PWM output signal.

Typically, the values of Ymax and Ymin for the power stages used to drive PMSM are Ymax=Vcc, the supply voltage, and Ymin=0, the ground voltage GND. For this reason, Vout=D×Vcc. Therefore, the average voltage values of the output voltages VA, VB, VC of the half-bridges M1-M4, M2-M5, M3-M6 can assume all the values are between ground GND (which corresponds to a duty-cycle D=0%) and the supply voltage Vcc (which corresponds to a duty-cycle D=100%). The back electromotive forces BEMF A, BEMF B, BEMF C are the BEMFs generated by the respective phase windings LA, LB and LC of the motor 10.

The detection of a the zero-cross of the BEMF of the motor 10 is obtained by placing at the high impedance condition or state the half bridge connected to the phase windings LA, LB or LC across which the zero-cross should be detected while the remaining two phase windings of the motor 10 are always driven by the control block 12. For example, the detection of the BEMF C is obtained by forcing the half bridge M3-M6 at the high impedance condition (i.e. the winding LC is unpowered) while the half bridges M1-M4, M2-M5 provide an output voltage.

Typically, a phase winding terminal C and the star center CT are coupled with the inputs of a comparator 13 for producing a logic signal OUTCOMP after having placed at the high impedance condition or state the half bridge M3-M6. When the voltage VC on the phase winding LC coincides with the voltage at the center point CT, there is the detection of the zero-cross event of the BEMF C.

In order to reduce the switching number and consequently the losses associated to the switchings, one of the half bridges M1-M4, M2-M5 is typically driven with a duty-cycle of 0% or 100% while the other of the two half bridges M1-M4, M2-M5 generates the average voltage to apply across the load formed by the series of the phase windings LA and LB.

In this way, the zero voltage value across the load is obtained by forcing both the half bridges M1-M4, M2-M5 to operate with a duty-cycle of 0% or 100%. For example, by forcing both the half bridges M1-M4, M2-M5 to operate with a duty-cycle of 0%, the average value of the voltage Vload applied at the load is:

$$Vload = Vout1 - Vout2 = D1 \times Vcc - D2 \times Vcc;$$

wherein Vout1 and Vout2 are the average voltages applied across the load by the power stages M1-M4, M2-M5, which operate with duty-cycles D1 and D2 respectively.

Since the half bridge M2-M5 operates with a duty-cycle D2=0 by generating the average voltage value Vout2=0, the above-mentioned equation becomes:

$$Vload = Vout1 = D1 \times Vcc.$$

Therefore, a minimum duty-cycle value may not be assured regardless of the voltage value Vload. A minimum duty-cycle value should be set by setting a minimum value of the voltage Vload and consequently a minimum value of the current flowing through the load which can be higher than the desired current value.

Figure 2:
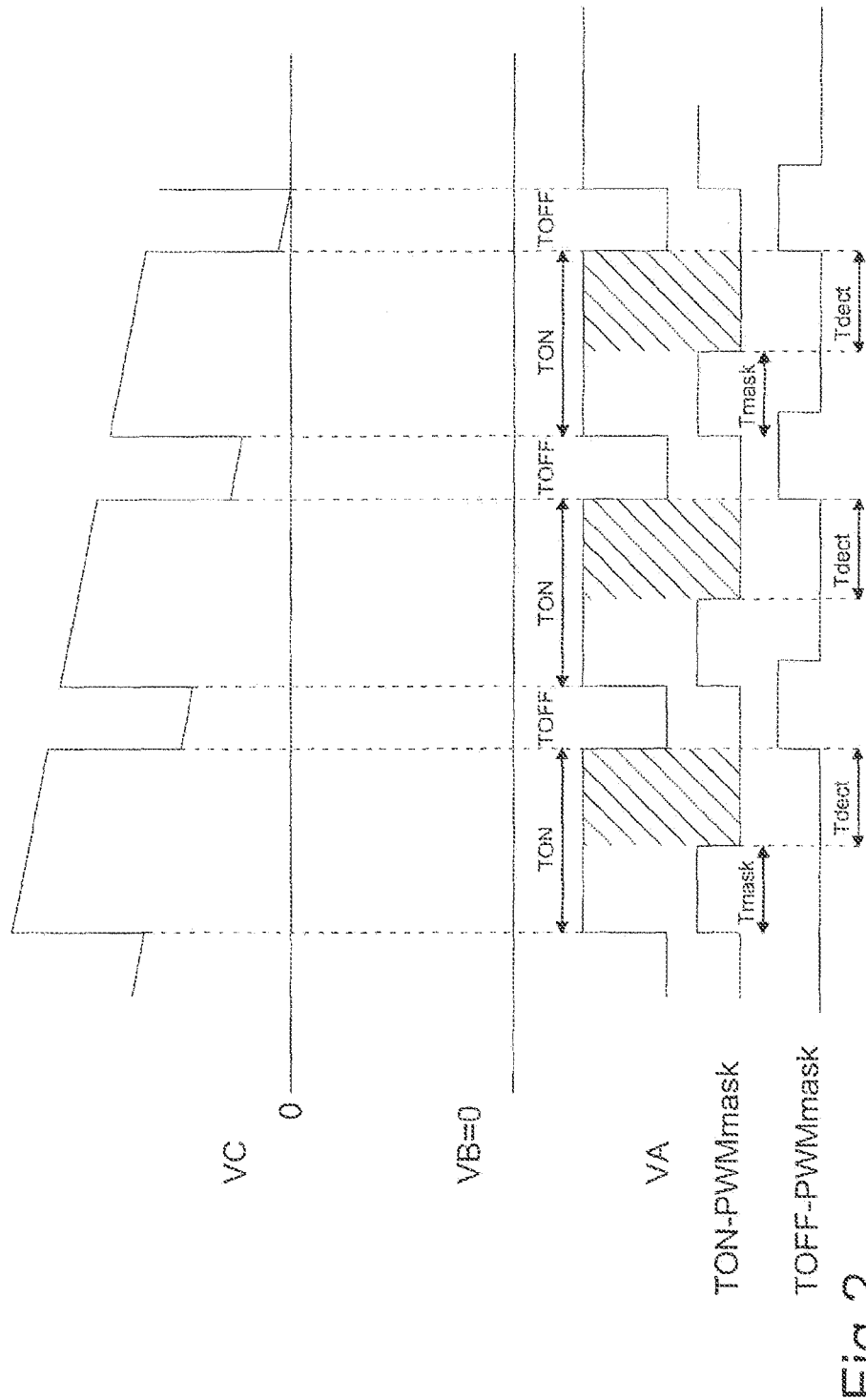
FIG. 2 shows waveforms of some signals in an apparatus, according to the prior art, for detecting the zero-cross event of the BEMF.

FIG. 2 shows the waveforms of the voltages VA, VB and VC next to the detection of the zero-cross of the BEMF C by setting D1=75% and D2=0% and the half bridge M3-M6 at high impedance condition. The voltage VC is the voltage of the BEMF C, to which a modulation depending on the switchings of the half bridge M1-M4 is superimposed. FIG. 2 shows the masking signals TON-PWMmask and TOFF-PWMmask generated by the control block 12 and having a duration of Tpwm/2. Tpwm is the switching period of the PWM driving signal Vpwmh1, Vpwml1 of the active half bridge M1-M4. The masking signals TON-PWMmask and TOFF-PWMmask are used to mask the signal BEMF C respectively in correspondence with each rising edge and falling edge of the PWM driving signal Vpwmh1, Vpwml1 of the half bridge M1-M4.

The masking signals TON-PWMmask and TOFF-PWMmask are introduced in the apparatus in FIG. 1 by an AND gate 14 having the inputs coupled with the output signal OUTCOMP of the comparator 13 and the masking signal TON-PWMmask or TOFF-PWMmask. The masking signals avoid the switching spikes produced by the comparator 13 at each switching of the active half bridge. In this case, the half bridge M1-M4, to affect the accuracy of the detection of the zero cross instant ZC of the BEMF C.

The duration of the masking window Tmask of the masking signal TON-PWMmask is smaller than the duration of the time period TON of the PWM driving signal Vpwmh1, Vpwml1. In this case, the detection of the zero-cross of the BEMF C during the time period TON may be obtained during the time windows Tdect. Instead, the duration of the masking window of the masking signal TOFF-PWMmask is greater than the duration of the time period TOFF of the PWM driving signal Vpwmh1, Vpwml1. In this case, the detection of the zero-cross of the BEMF C during the time period TOFF may be not obtained.

Figure 3:
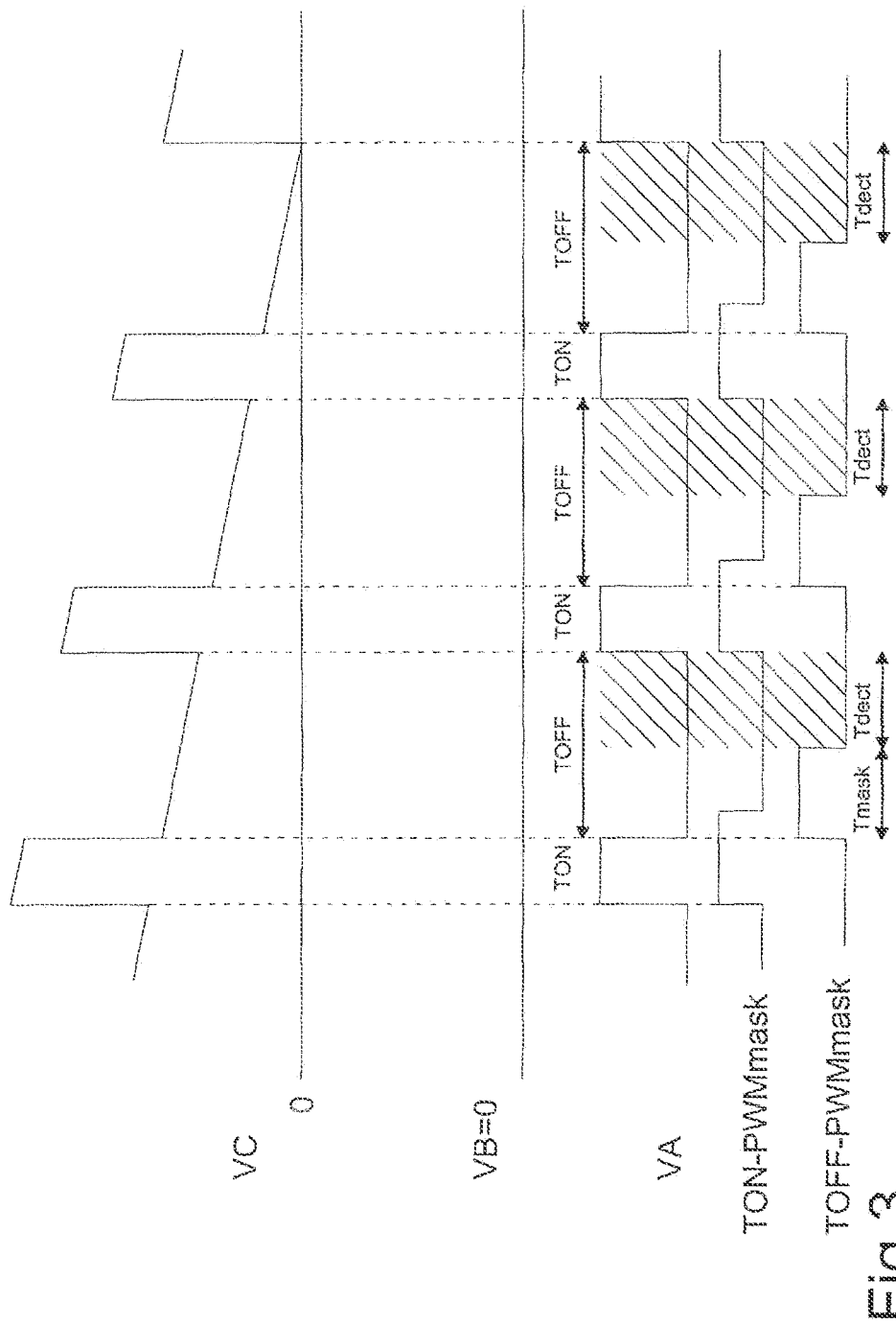
FIG. 3 shows the waveforms of some signals in an apparatus, according to the prior art, for detecting the zero-cross of the BEMF.

FIG. 3 shows the waveforms of voltages VA, VB and VC next to the detection of the zero-cross of the BEMF C by setting D1=25% and D2=0% and the half bridge M3-M6 at high impedance condition. The voltage VC is the voltage of the BEMF C, to which a modulation depending on the switchings of the half bridge M1-M4 is superimposed. FIG. 3 shows the masking signals TON-PWMmask and TOFF-PWMmask generated by the control block 12 and having a duration of Tpwm/2. Tpwm is the switching period of the PWM driving signal Vpwmh1, Vpwml1. The masking signals TON-PWMmask and TOFF-PWMmask are used to mask the signal BEMF C respectively in correspondence with each rising edge and falling edge of the PWM driving signal Vpwmh1, Vpwml1 of the active half bridge.

The duration of the masking window Tmask of the masking signal TON-PWMmask is greater than the duration of the time period TON of the PWM driving signal Vpwmh1, Vpwml1. In this case, the detection of the zero-cross of the BEMF C during the time period TON may not be obtained. Instead, the duration of the masking window of the masking signal TOFF-PWMmask is smaller than the duration of the time period TOFF of the PWM driving signal Vpwmh1, Vpwml1. In this case, the detection of the zero-cross of the BEMF C during the time period TOFF may be obtained during the time windows Tdect.

Figure 4:
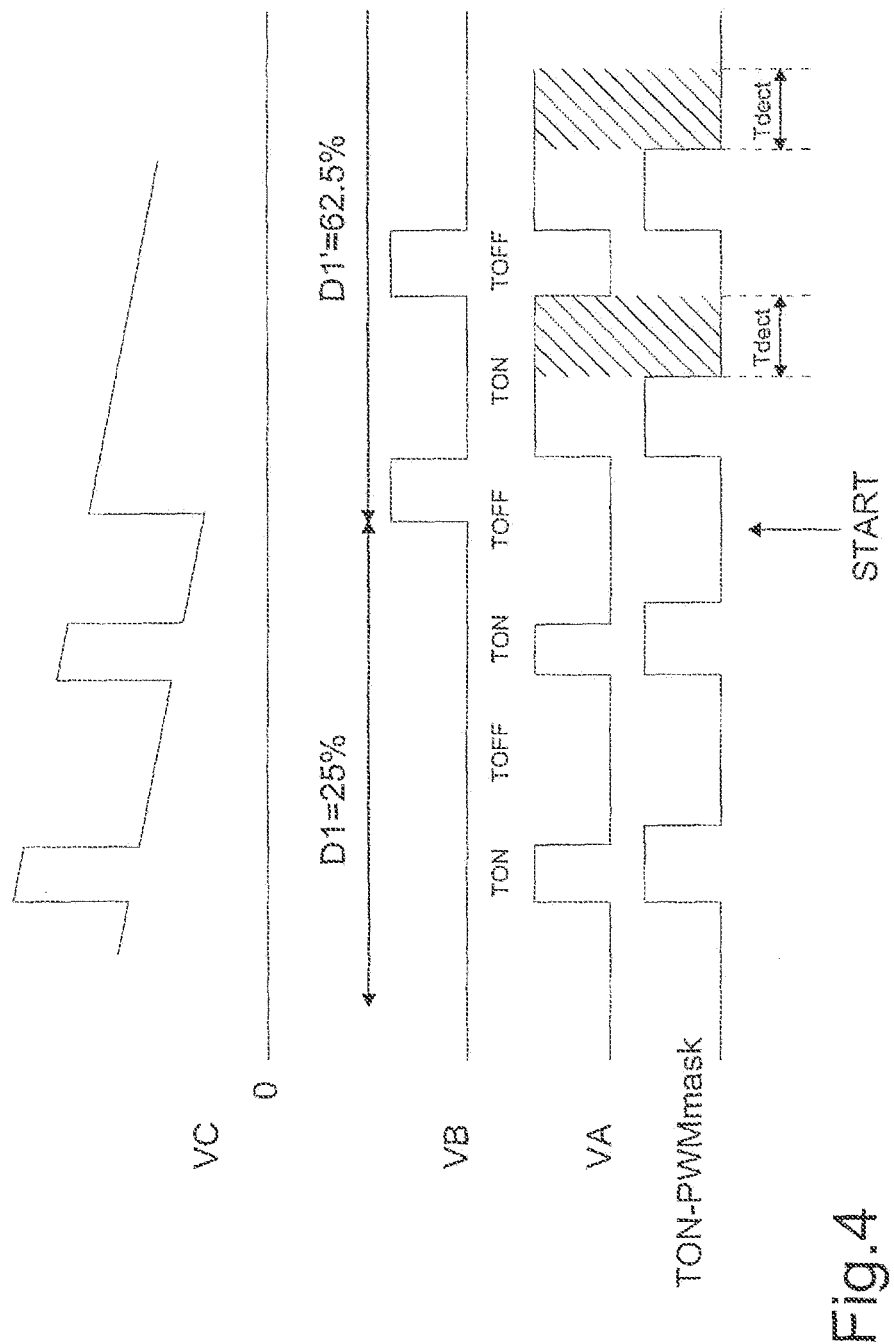
FIG. 4 shows the waveforms of some signals in the apparatus of FIG. 1 according to method for detecting the zero-cross event of the BEMF of a first embodiment of the present disclosure (ZC TOFF sampling is not enabled)

In accordance with a first embodiment of the present disclosure, the apparatus for detecting the zero-cross of the BEMF of a three-phase electric motor may carry out the detection of the zero-cross of the BEMF only during the on-time period TON of the PWM driving signal Vpwmh1, Vpwml1 while the detection of the of the zero-cross of the BEMF is inhibited during the off-time period of the PWM driving signal Vpwmh1, Vpwml1. In accordance with the first embodiment of the present disclosure, the control block 12 for detecting the zero-cross event ZC of the BEMF C (i.e. the zero-cross instant of the BEMF C) should verify if the duty-cycle D1 of the PWM driving signal Vpwmh1, Vpwml1 is set at a value such as the duration of the on time period TON is smaller than the duration of the masking window Tmask of the masking signal TON-PWMmask. If the verification is positive, the control block 12 should operate a change of the operation method in the proximity to the detection of the zero-cross of the BEMF C (indicated by the reference START in FIG. 4), i.e. should set the duty-cycle D2 to a value greater than zero and modify the value of the first duty-cycle D1 to have a duration of the on-time period TON of the first PWM driving signal Vpwmh1, Vpwml1 greater than the masking window Tmask of the masking signal TON-PWMmask (as shown by the waveform of the voltage VA in FIG. 4). In FIG. 4, ZC TOFF sampling is not enabled because the purpose is to detect the ZC during TON only. In this way, the zero-cross of the BEMF may be detected during the time period Tdect, i.e. the difference between the on-time period TON and the masking window Tmask of the masking signal TON-PWMmask. The duty-cycle D1 may be modified to maintain unchanged the average voltage Vload across the load relative to the first LA and second LB phase windings of the electric motor. In this way, the average voltage Vload is now given by:

$$Vload = Vout1 - Vout2 = D1 \times Vcc - D2 \times Vcc.$$

The value of the duty-cycle D1 should be modified so that $Vload = D1 \times Vcc - D2 \times Vcc$ is equal to $Vload = Vout1 = D1 \times Vcc$.

In some embodiments, the control block 12 sets the value D2=1−D1 and the half-bridges M1-M4, M2-M5 to operate at opposed phase the one relative to the other, i.e. the on-time period of the half-bridge M1-M4 corresponds to the off-time period of the half-bridge M2-M5 and the off-time period of the half-bridge M1-M4 corresponds to the on-time period of the half-bridge M2-M5. The average voltage across the load is:

$$Vload=Vout1-Vout2=D1 \times Vcc-(1-D1) \times Vcc.$$

In some embodiments, in this new operation method with D2 greater than zero, the value D1' of D1 should be modified to assure that the average voltage across the load is equal to the operation method with D2=0. Therefore, considering:

$$Vload=Vout1=D1 \times Vcc \text{ and } Vload=D1' \times Vcc-(1-D1' \times Vcc),$$

it is obtained that D1'=D1×0.5+0.5.

Therefore, the control block 12 sets the half bridge M1-M4 to operate with a duty-cycle D1' and the half bridge M2-M5 to operate with a duty-cycle D2=1−D1'; in this way, a minimum duty-cycle D1' equal to 50% is obtained, i.e. the voltage Vout=0 is obtained by setting a duty-cycle D1 with a minimum value of the 50% instead of a duty-cycle D1=0 of the typical methods and systems to detect the zero-cross of the BEMF of an electric motor.

FIG. 4 shows the diagrams of the voltages VA, VB and VC by setting D1=25% and D2=0% with the half bridge M3-M6 at high impedance condition and then, in the proximity to the detection of the zero-cross of the BEMF C (indicated by the reference START), by setting D1'=62.5% and D2=1−D1' with the half bridge M3-M6 at high impedance condition. The voltage VC is the voltage of the BEMF C, to which a modulation depending on the switchings of the half bridge M1-M4 is superimposed. FIG. 4 shows the masking signal TON-PWMmask generated by the control block 12 and having a duration of Tpwm/2, wherein Tpwm is the switching period of each PWM driving signal. The masking signal TON-PWMmask is used to mask the signal of the BEMF C respectively in correspondence of each rising edge of the PWM driving signal Vpwmh1, Vpwml1 of the half bridge M1-M4.

The duration of the masking window Tmask of the masking signal TON-PWMmask is smaller than the duration of the time period TON of the PWM driving signal. In this case, the detection of the zero-cross of the BEMF C during the time period TON may be obtained during the time windows Tdect.

Figure 5:
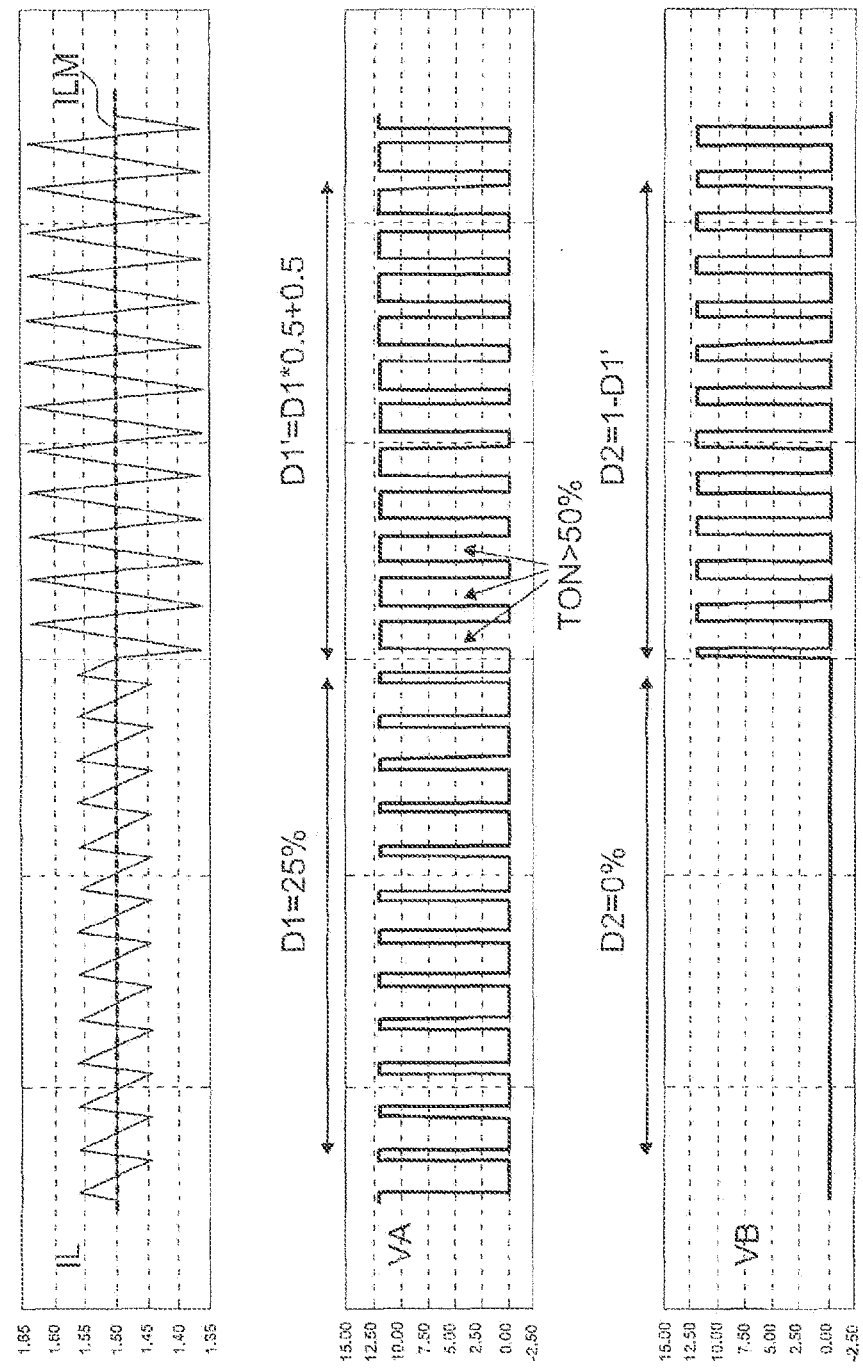
FIG. 5 shows a comparison between the waveforms of some signals in the apparatus, according to the prior art, for detecting the zero-cross of the BEMF, and the waveforms of the same signals in the apparatus of FIG. 1, according to the method for detecting the zero-cross event of the BEMF of the first embodiment of the present disclosure.

FIG. 5 shows the voltages VA and VB and the current IL flowing through a load representing the series of the winding LA and LB with the apparatus in FIG. 1, which operates according to the typical approach (with D1=25%, D2=0% and the half bridge M3-M6 arranged at high impedance condition) and according to the teachings of the present disclosure (D1'=62.5%, D2=1−D1' with the half bridge M3-M6 arranged at high impedance condition). The average current ILM flowing through the load representing the series of the winding LA and LB is not modified by the change of the driving method of the power stage 11 and the duty-cycle value passes from a value smaller than 50% to a value greater than 50% (adapted to the detection of the zero-cross of the BEMF C) during the on-time period even when the masking signal TON-PWMmask generated by the control block 12 has a duration of Tpwm/2.

According to a second embodiment of the present disclosure, the apparatus for detecting the zero-cross of the BEMF of a three-phase electric motor may comprise all the features of the apparatus according to the first embodiment of the present disclosure except that the control block 12, instead of setting the half-bridges M1-M4, M2-M5 to operate at opposed phase relative to one another, the control block 12 sets the half bridges M1-M4, M2-M5 at high impedance condition only during the time period TOFF of the PWM driving signal Vpwmh1, Vpwml1 of the half bridge M1-M4. In this case, if the current flowing through the load is not null, each one of the body diodes D1, 24, D2, D5 connected in parallel to a respective switch of the half bridges M1-M4, M2-M5 turns on itself automatically.

The average voltage Vload applied across the load is lower than that relative to the first embodiment of the present disclosure. In fact, the voltage Ymin during the time period TOFF of the half bridge M1-M4 is not zero (or ground GND), but it is equal to a −Vbe where Vbe is the voltage threshold of each body diode of the diodes D1, D2, D4, D5, and the maximum voltage Ymax is not VCC but is equal to VCC+Vbe. In this way, the average voltage applied across the load is lower than the desired value.

Figure 6:
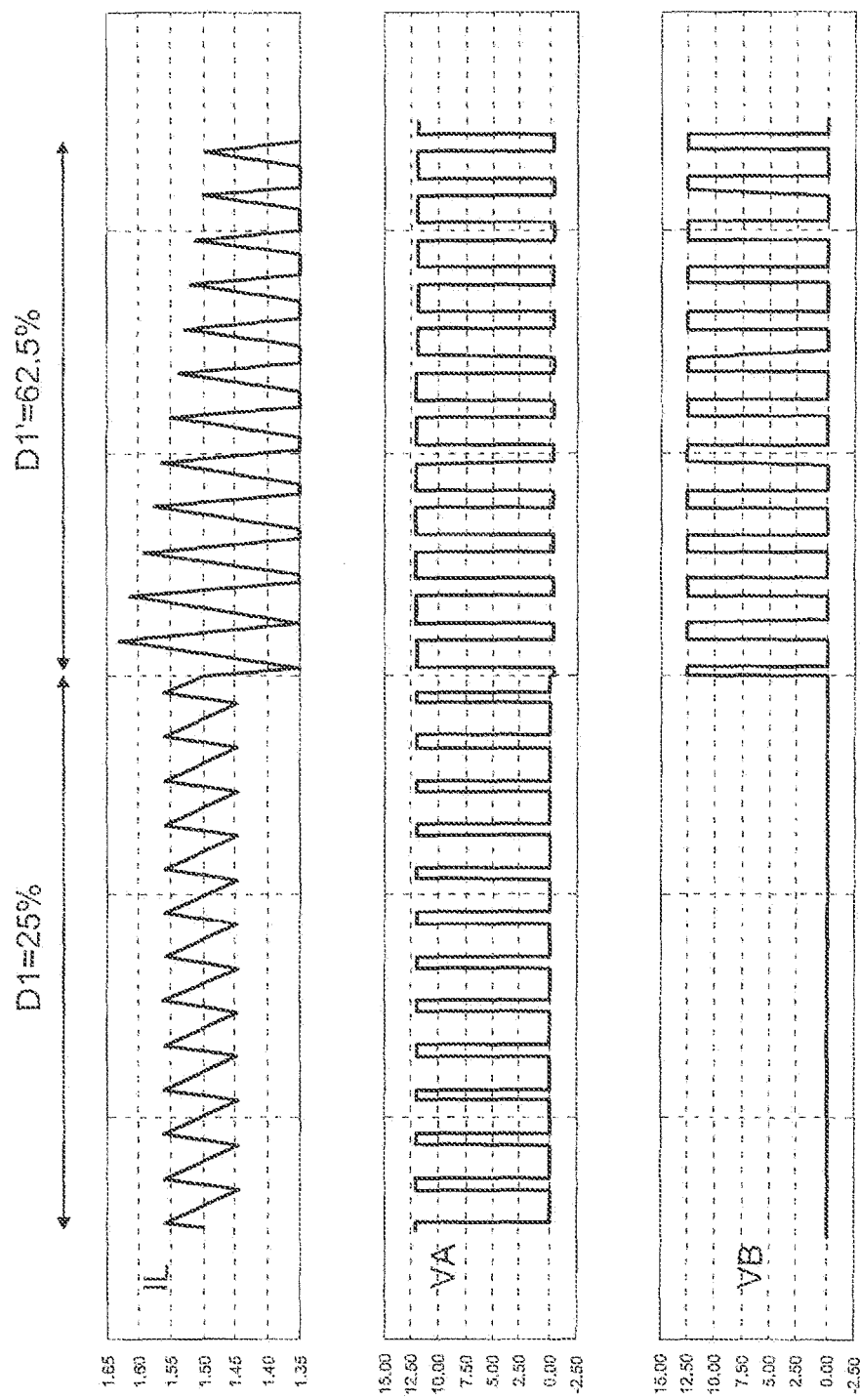
FIG. 6 shows another comparison between the waveforms of some signals in the apparatus, according to the prior art, for detecting the zero-cross of the BEMF, and the waveforms of the same signals in the apparatus of FIG. 1, according to the method for detecting the zero-cross event of the BEMF of the second embodiment of the present disclosure.

FIG. 6 shows the voltages VA and VB and the current IL flowing through a load representing the series of the winding LA and LB with the apparatus in FIG. 1, which operates according to the typical approach (with D1=25%, D2=0% and the half bridge M3-M6 arranged at high impedance condition) and according to the approach of the present disclosure (D1'=62.5%, D2=1−D1' with the half bridge M3-M6 arranged at high impedance condition), half bridges M1-M4, M2-M5 are placed at high impedance condition only during the time period TOFF of the PWM driving signal Vpwmh1, Vpwml1 of the half bridge M1-M4. The average current ILM flowing through the load representing the series of the winding LA and LB is lightly lower than that of the apparatus according to the first embodiment of the present disclosure. An offset value of the duty-cycle can be added to the value D1' to compensate the value of the average current ILM and to make the current ILM to be equal to that of the apparatus according to the first embodiment of the present disclosure.

That which is claimed is:

1. Apparatus to detect a zero-cross event of a back electromotive force (BEMF) of an electric motor with first, second, and third phase windings driven by respective first, second, and third power driving stages, the apparatus comprising:
   a zero-cross detecting circuit; and
   a control circuit configured to control the first, second, and third power driving stages by at least
      placing at an impedance state the third power driving stage relative to the third phase winding, the third phase winding being coupled to said zero-cross detecting circuit,
      driving the first power driving stage relative to the first phase winding with a first pulse width modulated (PWM) driving signal,
      introducing a masking signal to mask an output signal of said zero-cross detecting circuit in correspondence with each rising edge of the first PWM driving signal, and
      determining whether a first duty-cycle of the first PWM driving signal relative to the first phase winding is such that a duration of a masking window of the masking signal is greater than an on-time period of the first PWM driving signal, and if then,
         driving the second power driving stage relative to the second phase winding with a second PWM driving signal with a second duty-cycle greater than zero, and modifying the first duty-cycle to have a duration of the on-time period of the first PWM driving signal greater than the masking window of the masking signal.

2. The apparatus according to claim 1 wherein said control circuit, if the first duty-cycle of the first PWM driving signal is such that the duration of the masking window is greater than the on-time period of the first PWM driving signal, is configured to:
set a value of the second duty-cycle to be one minus the first duty-cycle; and
set an on-time period and an off-time period of the second PWM driving signal to correspond respectively to an off-time period and the on-time period of the first PWM driving signal.

3. The apparatus according to claim 1 wherein said control circuit, if the first duty-cycle of the first PWM driving signal is such that the duration of the masking window is greater than the on-time period of the first PWM driving signal, is configured to:
set a value of the second duty-cycle to be one minus the first duty-cycle; and
place at the impedance state the first and second power driving stages only during an off-time period of the first PWM driving signal.

4. The apparatus according to claim 1 wherein the control circuit, if the first duty-cycle of the first PWM driving signal is such that the duration of the masking window is greater than the on-time period of the first PWM driving signal, is configured to:
set a new value of the first duty-cycle of the first PWM driving signal to be half of the first duty-cycle plus 0.5; and
set the second duty-cycle of the second PWM driving signal to be one minus the first duty-cycle.

5. The apparatus according to claim 1 wherein the electric motor comprises a permanent magnet synchronous motor (PMSM).

6. The apparatus according to claim 1 wherein the masking signal has a duration equal to 50% of a switching period of at least one of the first and the second PWM driving signals.

7. A control circuit for detecting a zero-cross event of a back electromotive force (BEMF) of an electric motor with first, second, and third phase windings driven by respective first, second, and third power driving stages, the control circuit comprising:
circuitry configured to
place at an impedance state the third power driving stage relative to the third phase winding, the third phase winding being coupled to a zero-cross detecting circuit,
drive the first power driving stage relative to the first phase winding with a first pulse width modulated (PWM) driving signal,
introduce a masking signal to mask an output signal of the zero-cross detecting circuit in correspondence with each rising edge of the first PWM driving signal, and
determine whether a first duty-cycle of the first driving signal relative to the first phase winding is such that a duration of a masking window of the masking signal is greater than an on-time period of the first driving signal, and if then,
drive the second power driving stage relative to the second phase winding with a second driving signal with a second duty-cycle greater than zero, and modify the first duty-cycle to have a duration of the on-time period of the first driving signal, the first duty-cycle being greater than the masking window of the masking signal.

8. The control circuit according to claim 7 wherein said circuitry, if the first duty-cycle of the first driving signal is such that the duration of the masking window is greater than the on-time period of the first driving signal, is configured to:
set a value of the second duty-cycle to be one minus the first duty-cycle; and
set an on-time period and an off-time period of the second driving signal to correspond respectively to an off-time period and the on-time period of the first driving signal.

9. The control circuit according to claim 7 wherein said circuitry, if the first duty-cycle of the first driving signal is such that the duration of the masking window is greater than the on-time period of the first driving signal, is configured to:
set a value of the second duty-cycle to be one minus the first duty-cycle; and
place at the impedance state the first and second power driving stages only during an off-time period of the first driving signal.

10. The control circuit according to claim 7 wherein the circuitry, if the first duty-cycle of the first driving signal is such that the duration of the masking window is greater than the on-time period of the first driving signal, is configured to:
set a new value of the first duty-cycle of the first driving signal to be half of the first duty-cycle plus 0.5; and
set the second duty-cycle of the second driving signal to be one minus the first duty-cycle.

11. The control circuit according to claim 7 wherein the electric motor comprises a permanent magnet synchronous motor (PMSM).

12. The control circuit according to claim 7 wherein the masking signal has a duration equal to 50% of a switching period of at least one of the first and the second driving signals.

13. A method for detecting a zero-cross event of a back electromotive force (BEMF) of an electric motor with first, second, and third phase windings driven by respective first, second, and third power driving stages, the method comprising:
placing at an impedance state the third power driving stage relative to the third phase winding, the third phase winding being coupled to a zero-cross detecting circuit;
driving the first power driving stage relative to the first phase winding with a first pulse width modulated (PWM) driving signal;
introducing a masking signal to mask an output signal of the zero-cross detecting circuit in correspondence with each rising edge of the first PWM driving signal; and
determining whether a first duty-cycle of the first PWM driving signal relative to the first phase winding is such that a duration of a masking window of the masking signal is greater than an on-time period of the first PWM driving signal, and if then;
driving the second power driving stage relative to the second phase winding with a second PWM driving signal with a second duty-cycle greater than zero, and modifying the first duty-cycle to have a duration of the on-time period of the first PWM driving signal greater than the masking window of the masking signal.

14. The method according to claim 13 wherein, if the first duty-cycle of the first PWM driving signal is such that the duration of the masking window is greater than the on-time period of the first PWM driving signal, further comprising:

setting a value of the second duty-cycle to be one minus the first duty-cycle; and setting an on-time period and an off-time period of the second PWM driving signal to correspond respectively to an off-time period and the on-time period of the first PWM driving signal.

15. The method according to claim 13 wherein, if the first duty-cycle of the first PWM driving signal is such that the duration of the masking window is greater than the on-time period of the first PWM driving signal, further comprising:

setting a value of the second duty-cycle to be one minus the first duty-cycle; and placing at the impedance state the first and second power driving stages only during an off-time period of the first PWM driving signal.

16. The method according to claim 13 wherein, if the first duty-cycle of the first PWM driving signal is such that the duration of the masking window is greater than the on-time period of the first PWM driving signal, further comprising:

setting a new value of the first duty-cycle of the first PWM driving signal to be half of the first duty-cycle plus 0.5; and setting the second duty-cycle of the second PWM driving signal to be one minus the first duty-cycle.

17. The method according to claim 13 wherein the electric motor comprises a permanent magnet synchronous motor (PMSM).

18. The method according to claim 13 wherein the masking signal has a duration equal to 50% of a switching period of at least one of the first and the second PWM driving signals.

* * * * *